Jan. 12, 1932. W. H. SOMMER 1,841,261
OPEN HEARTH FURNACE AND METHOD OF OPERATING THE SAME
Filed Jan. 30, 1931 5 Sheets-Sheet 2
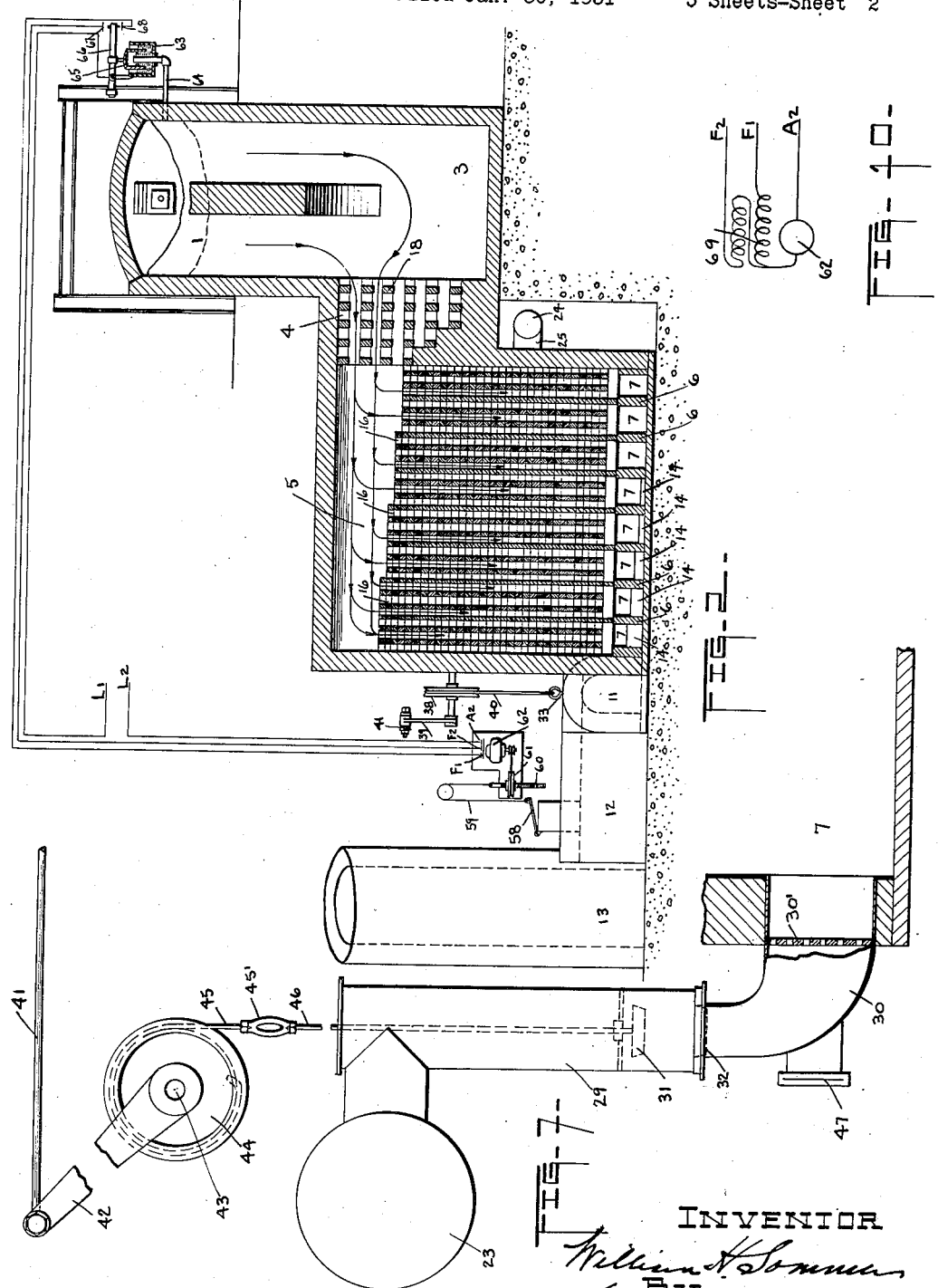

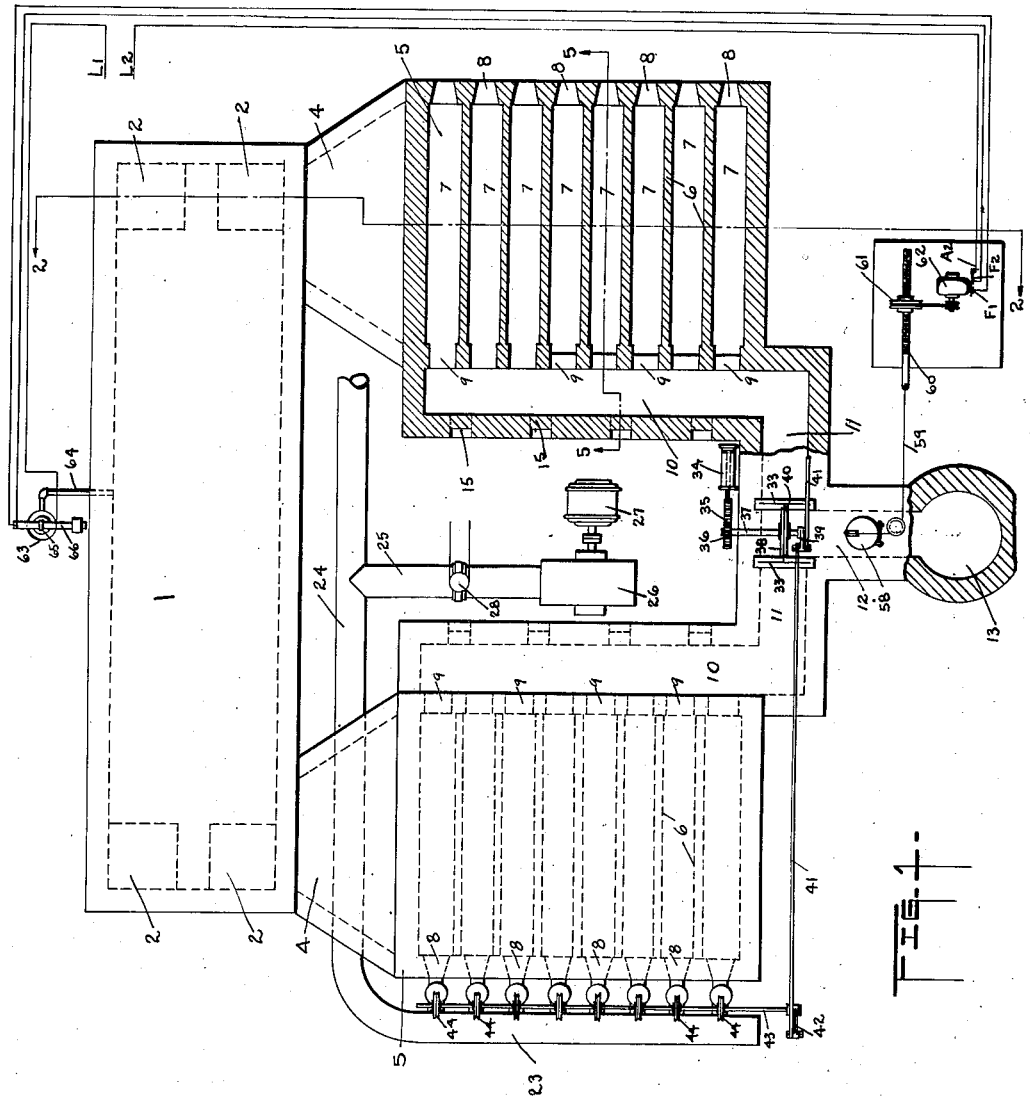

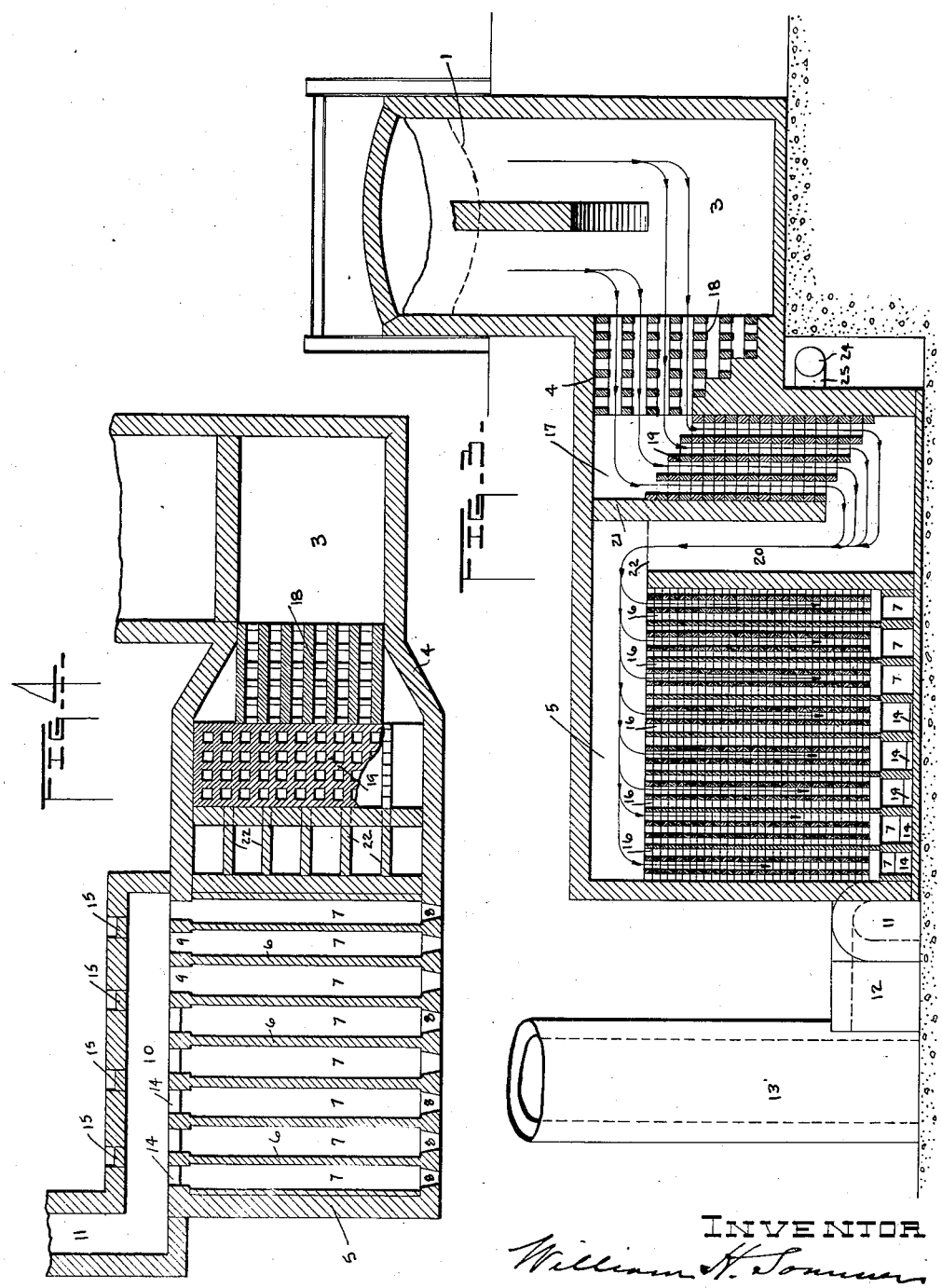

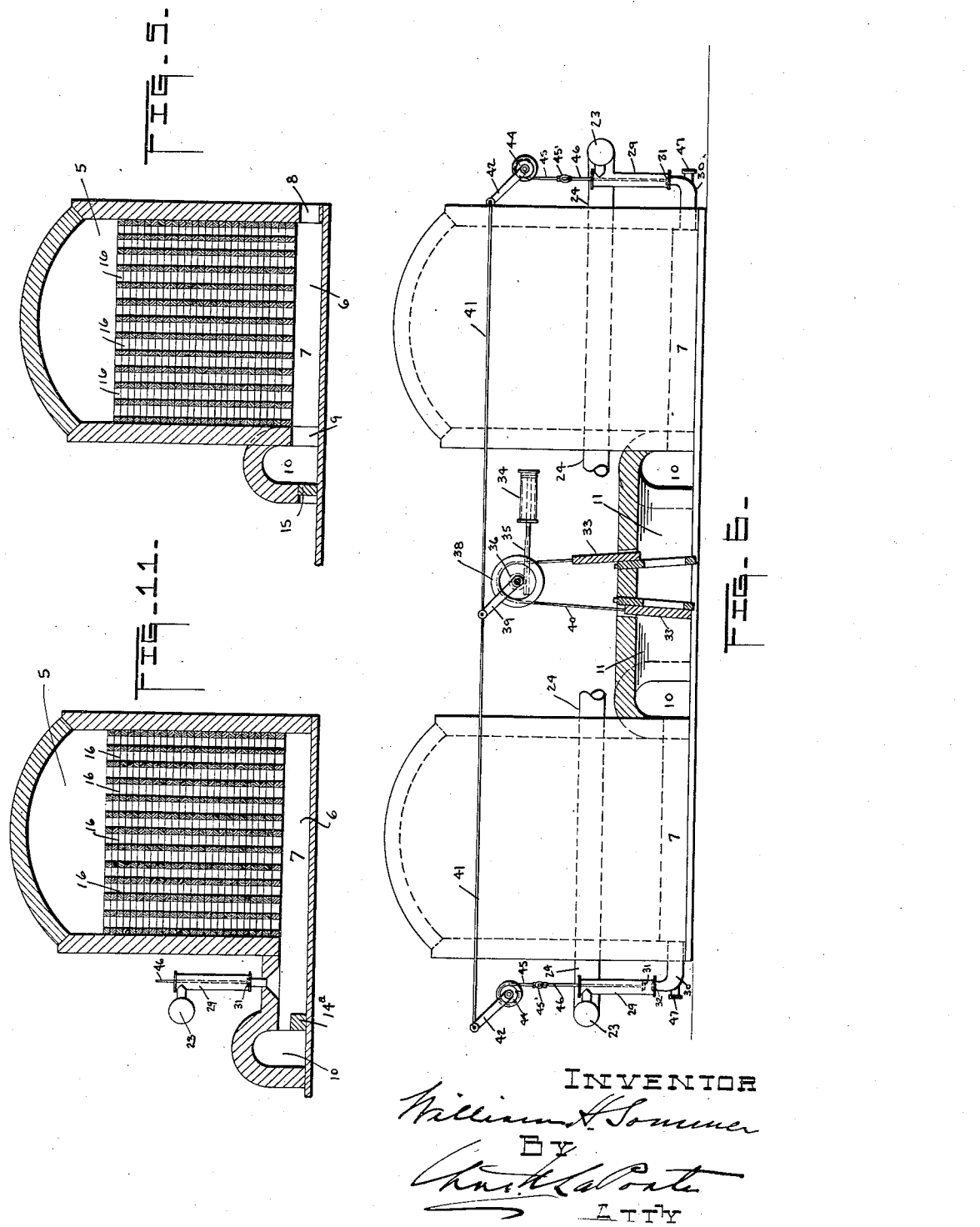

Jan. 12, 1932.   W. H. SOMMER   1,841,261
OPEN HEARTH FURNACE AND METHOD OF OPERATING THE SAME
Filed Jan. 30, 1931    5 Sheets-Sheet 5
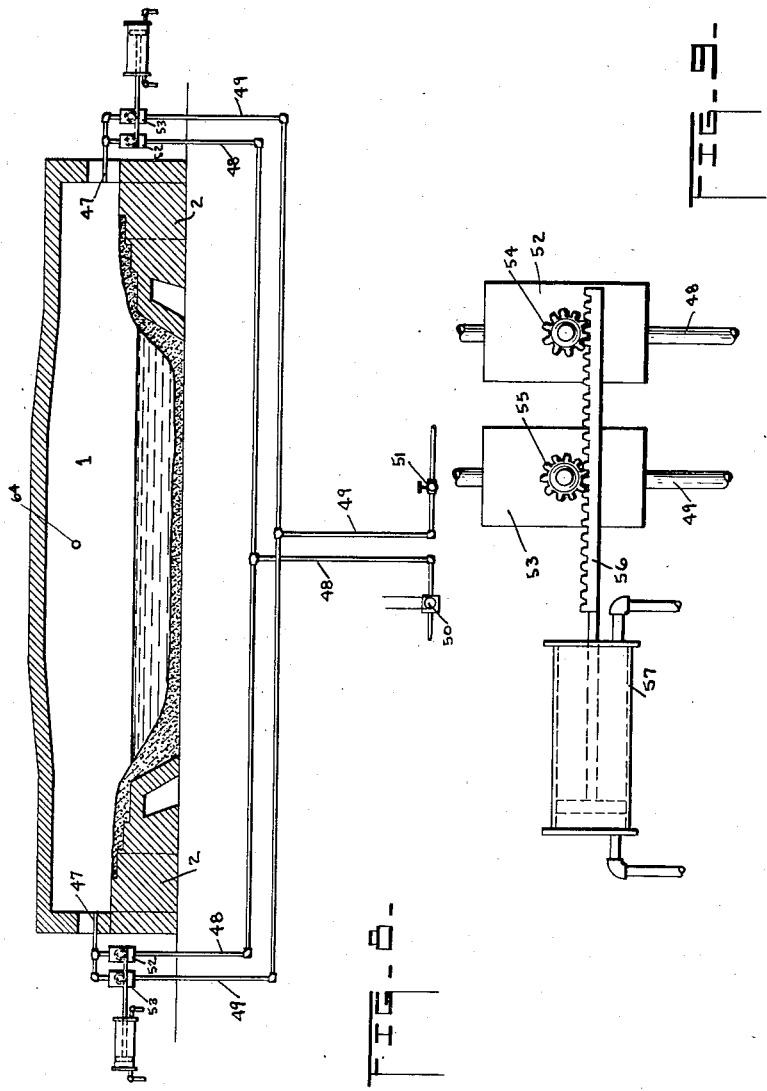

Patented Jan. 12, 1932

1,841,261

UNITED STATES PATENT OFFICE

WILLIAM H. SOMMER, OF PEORIA, ILLINOIS

OPEN HEARTH FURNACE AND METHOD OF OPERATING THE SAME

Application filed January 30, 1931. Serial No. 512,293.

This invention has reference to a new and improved method of operating open hearth furnaces and to the structure of such a furnace by means of which the method may be practiced; and the particular object which I have in mind is to provide for the introduction of air into the regenerative chambers at a point or points different from the point or points of egress of the products of combustion therefrom, preferably, although not necessarily, from the opposite side of the regenerative chambers where the outgoing products of combustion leave the regenerators. The regenerative chambers and checker work are designed, as hereinafter more particularly pointed out, for an effective and even distribution of the outgoing products of combustion through the checkers and when the furnace is reversed an effective and even distribution of the air into and through such checkers.

In the operation of open hearth furnaces, an important problem is the proper and effective heating of the incoming air by the checkers which are heated by the waste gases or products of combustion which pass therethrough as they leave the furnace. The meeting of the problem to effectively heat the incoming air requires the proper distribution of the outgoing gases evenly through the checkers and the proper distribution of the air evenly over the entire checkers, and it is to this even distribution of the outgoing gases and incoming air that the present invention is directed.

In the attempt to solve this problem, which in a measure has been partly successful, deep regenerators and checkers have been resorted to, in which, a thermo balance is set up which will give a somewhat better distribution of both the waste gases and the air than is obtained with the use of the ordinary shallow regenerators. The expense of deep checkers, however, is very great and in many cases impossible due to ground conditions, especially where operators are confronted with serious water difficulties. To overcome such conditions and obstacles I propose, instead of deepening the checkers to expand them in a direction where room for the same already exists in practically almost all open hearth structures and that is to make the checker chamber long, as measured in a direction at right angles to the length of the furnace proper, or at right angles to the length of the hearth. Furthermore, in the structure of my invention the bottom of the checker work comprises a plurality of spaced rider-walls which will provide conduits or flues therebetween, into one end of each of which the incoming air to the furnace is introduced; the opposite ends of such flues or conduits being in communication with an exhaust tunnel or waste gas flue and on top of these rider-walls the checker work is built up of the vertical-flue-checker type. In this manner, the outgoing gases will always be in a direction downwardly through the checker work until such gases enter the flues or conduits between the rider-walls when such gases travel laterally to and through the exhaust tunnel or waste gas flue; also, the incoming air entering the flues or conduits between the rider-walls will travel upwardly through the checker flues. The air and exhaust gases move vertically with a sidewise movement, if any, in one direction only, and the checkers are thereby effectively and evenly heated throughout and consequently, the air is more evenly distributed over and throughout the entire checkers and effectively heated.

It is the practice and common to all open hearth furnaces, as far as I am aware, to employ the exhaust tunnel, which carries the outgoing gases or products of combustion, as the means of distributing the incoming air to the checkers. In my design of furnace, however, this is not the case, as the air enters the ends of the conduits or flues between the rider-walls opposite to the point of exhaust of the products of combustion therefrom. This construction provides the opportunity for reducing certain of the exhaust or exit openings between the checkers and the gas tunnel which will give or insure an even distribution of exhaust gases throughout the entire checker chamber.

The invention has for a further object to provide for the distribution of the exhaust gases evenly throughout the regenerative chambers and the passage of the air admitted to the regenerators evenly throughout said regenerators, and this may be accomplished by stepping off the checker-work at the top of the checkers in a single-pass-chamber and provide a plurality of flues, at the base of the checkers, between rider-walls, which said flues are disposed transversely to the admission of the products of combustion from the furnace proper; then by a proper throttling, blocking-off or graduated restriction of the openings at the exhaust ends of the flues insuring an even distribution of the exhaust gases throughout the regenerators; such an arrangement, with the inclusion of regulated and controlled air inlets at the opposite ends of the flues insures a controllable flow and even distribution of the air into and throughout said regenerators.

A further object of the invention is to provide in combination with the controlling means for insuring the even distribution throughout the regenerators of the exhaust gases and the incoming air, a means for introducing measured quantities of fuel and air to the furnace proper and to automatically control the furnace draft in conformity with the furnace combustion.

A still further object of the invention is a more efficient control of the iron oxide and other impurities as they leave the furnace proper and before reaching the checkers proper of the regenerative chambers; whereby to insure longer life to the checker work, as well as preventing disintegration thereof due to slag accumulation and further, to provide an improved means for the deposit or collection of the slag before the same can reach the checkers proper.

With the foregoing and other objects, as will more fully appear, a more effective and longer use may be obtained of the checkers and a more effective furnace operation obtained, at a consequent lessening of cost in furnace repair and the consequent lessening in cost of production of steel.

In carrying out the inventions I have in mind that somewhat comparable results may be obtained with checker work in or under the fan-tail arches stepped up from the slag-pockets to the checkers for the collection of iron oxide and other impurities which, by gravity, may gravitate to the bottom of the slag-pockets, and which shall function as scrubbers during the passage of the products of combustion from the furnace proper to the checkers, and in the use of one or more passes in the checkers, which, if more than one pass is used in the checkers will function in the way of checking the slag flow to the checkers proper and provide a greater area of heating surface for the incoming air.

That the invention may be more fully understood, reference is had to the accompanying drawings, forming part of this description, illustrating a preferred embodiment of the invention, in which—

Fig. 1 is a plan view, partly in full lines and partly in section showing so much of a single pass regenerative furnace, in outline, as is necessary to illustrate the structure and method of the invention, including a diagrammatic showing of a stack damper control;

Fig. 2 is a cross-section of a furnace in elevation, as the same would appear if taken on the line 2—2 Fig. 1;

Fig. 3 is an elevation, in section, of a furnace similar to what is disclosed in Figs. 1 and 2 except that the regenerative chamber is a multiple or preferably three pass chamber;

Fig. 4 is a plan view, in section, of what is shown in Fig. 3, except that the section through the chamber, occupied by the main checker work, is taken through the flues at the base of the checker work;

Fig. 5 is a cross-section, in elevation, as the same would appear if taken on the line 5—5 Fig. 1;

Fig. 6 is an elevation of the furnace, partly in section, as it would appear from in front of the regenerative chambers, showing the means for controlling the admission of air to the regenerative chambers and the coacting dampers in the flues leading to the stack, and operating means;

Fig. 7 is a detail, in elevation and partly in section, showing the means for introducing and controlling the introduction of air to a regenerative chamber;

Fig. 8 is a longitudinal sectional view through the furnace proper showing the means for feeding measured quantities of fuel to the furnace;

Fig. 9 is a detail of the operating means for introducing measured quantities of fuel and air to the furnace;

Fig. 10 is a diagrammatic view of a double field winding in the reversing means for the motor employed in the stack damper control, and Fig. 11 is a cross section of a modified arrangement for introducing air to a regenerator, at a different point from the exhaust of the gases from the regenerator, but on the same side of the regenerator from which the exhaust gases are taken off.

Like characters of reference denote corresponding parts throughout the figures.

The furnace, as will be understood, is of the reversing regenerative type and includes the usual melting chamber or hearth portion 1, at the opposite ends of which are disposed the usual sets of flues 2, which are alternately employed as uptakes in one instance and downtakes in another instance; depending, of course, on which end of the furnace is then the intake end or the exhaust end and which are also in communication with slag-pockets 3. Coupled to the portion 1, through fan-tail arches 4, are the opposed regenerative chambers 5.

In the instant showing of the regenerators, they are preferably extended, in a direction measured at right angles to the length of the hearth 1, so that the surface area of the checker work is enlarged considerably in a direction, nearly always available, which is not always feasible for increase depth of checkers because of excessive cost and ground and soil conditions.

The regenerative chambers of Figs. 1 and 2 differ somewhat from those shown in Figs. 3 and 4 in that the former, while showing an increase in length, as measured outwardly from the furnace proper, to provide an increase in the heating surface of the checkers, are disclosed as single pass regenerative chambers; whereas, the latter figures disclose a multiple or preferably three-pass-checker chamber, wherein a much larger heating surface of checker work is provided and wherein, owing to certain characteristics of construction, certain advantages will lie.

The bottom of the regenerators 5 are constructed of a plurality of spaced rider-walls 6, which preferably are arranged or disposed parallel to each other and the hearth 1, see Fig. 1, and the spacing of the rider-walls provides flues or conduits 7 therebetween which lie transversely to the greatest length of the regenerators 5 and parallel with the rider-walls. Also, these flues or conduits 7 preferably open through the opposite walls of the regenerators 5. The outer open end portions 8 of these flues or conduits are in communication with controlled distributing inlets for the air entering the furnace and the inner open end portions 9 of these flues or conduits are in communication with an exhaust tunnel or waste gas flue 10 disposed longitudinally the length of the chambers 5 and at right angles to the length of flues or conduits 7. Both said exhaust tunnels or waste gas flues 10 communicate with a lateral 11 and said lateral, in turn, is in communication with a short flue 12 in communication with a stack 13. The openings 8 in the outer walls of the chambers 5, which provide communication between the controlled distributing inlets and the flues or conduits 7, between the rider-walls 6, have diverging walls, see Fig. 1, whereby to provide comparatively larger egress ends than the inlet ends, so that the air which is forced under pressure into the regenerative chambers will enter the flues or conduits 7 under a reduced pressure and be distributed evenly throughout such conduits or flues and flow more evenly throughout the checkers of the regenerators and without, as is usually the case, thru the inertia of the moving air being carried to the side of the regenerator 5 opposite to that where it is introduced, and follow restricted lanes or channels of travel through the regenerators and checkers thereof. Instead, as just previously mentioned, the air will be distributed evenly throughout the checkers as it flows to the furnace proper.

As pointed out, the flues or conduits 7 are arranged in the base of the regenerators at right angles to the greatest length of the regenerators and to the normal and natural path of travel of the outgoing gases, entering the chambers from the hearth, and said flues or conduits communicate with the exhaust tunnel or waste gas flue 10 through the exhaust openings 9 in the inside wall of the regenerators 5, see Fig. 1, and to insure an even distribution throughout the regenerators and to and throughout the flues or conduits 7, the exhaust or exit end openings 9 of these flues or conduits are throttled, blocked-off, choked or restricted, as operating conditions may require, or demand, to obtain the best or most ideal conditions of an even distribution of the exhaust gases passing out through the regenerators as will most effectively and uniformly heat the checkers; whereby, when the furnace is reversed the incoming air will be effectively heated by the checkers as it is distributed, in its travel throughout the said chambers. As an example of an effective throttling or restricting of the egress openings 9 of the flues or conduits 7 I have shown in Figs. 2 and 3 a throttling or blocking off of certain of said openings, by suitable closures or fillers 14, which are greatest or cover or close larger areas of the openings, beginning with the opening 9 in the flues or conduits 7 located farthest from the furnace proper and graduating the size of these closures or fillers 14 in the openings of the following and successive flues or conduits, leaving, as operating conditions may require, certain of the exhaust openings of certain of the flues without closures or fillers, as will be seen; the result of which will be to insure a more uniform distribution of the exhaust gases throughout the regenerators and a more even and effective heating of the checkers thereof, with the result, that the checkers will more effectively heat the incoming air passing through the checkers. To facilitate the insertion and removal of such closures or fillers 14 in the exhaust openings 9, of the flues or conduits 7, the exposed walls of the gas tunnels or waste gas flues 10 are provided with bulk-heads 15 so located, that when removed access may be had to the openings 9 for the insertion and removal of the closures or fillers 14, as will be understood.

The main checker work in the regenerative chambers 5 is preferably built up in the form of vertical flues which are built upon and supported by the rider-walls 6, see Figs. 2 and 3. These vertical flues are designated 16 and they are so arranged and disposed that the exhaust gases which enter at the top from the furnace and travel downwardly through these flues, to the flues or conduits 7, move vertically with a sidewise movement, if any, in one direction only and that sidewise of the greatest length of the checkers or in the direction of the exhaust from the regenerative chambers. This arrangement of vertical flues in connection with the transverse flues or conduits, between the rider-walls, and the proper and balanced throttling or closing of the exhaust openings 9, further enhances an effective and well balanced and even distribution of the exhaust gases through the checkers.

In Fig. 2 I have shown the checkers as arranged with, what I shall refer to as a single-pass-regenerative chamber and in Fig. 3 I have shown the checkers as arranged with, what I shall refer to as a multiple or three-pass-regenerative chamber. In the former figure there is interposed between the checker work proper and the slag-pocket, the fan-tail arch 4. In the latter figure the fan-tail arch connects the slag-pocket with an interposed checker 17 and the main checker, in which arrangement there is provided a multiple or three-pass-regenerative chamber, as shown. In both instances there is provided under the fan-tail arch a checker work 18, which as shown, is preferably stepped up at its bottom portion from the slag-pocket, and the said checker work acts to scour the outgoing products of combustion, to reduce and possibly prevent the formation or collection of slag in the main checkers and for the deposit, by weight or gravity, of iron oxide and any other impurities carried off by the outgoing gases, and effects collection of the same in the slag-pocket. In Fig. 2 I show it preferable to step-up the upper ends of the vertical flues 16 of the checker work from the fan-tail arch and its checker work, which, together with the throttling or restricting of the outgoing or exhaust ends of the flues or conduits 7 renders more effective and more even distribution of the outgoing gases, as is indicated by the arrangement of the arrows in Fig. 2, which illustrates the movement of the outgoing gases. Fig. 2, as pointed out, illustrates what I have designated as a single-pass-regenerative chamber.

Referring now to Fig. 3, the main checker work with its vertical flues 16 is not unlike that disclosed in Fig. 2, except that in its assembly with a multiple or three-pass-regenerative chamber I do not deem it necessary to step-up the upper portion of the checker work, as is disclosed in Fig. 2 and for the purpose of both increasing the facilities for heating the incoming air, following each reversal of the furnace, and for a more effective collection of slag and iron oxide, as well as other impurities carried off with the products of combustion, which will result in a longer life for the checker work proper, I have interposed between the main checker work having the vertical flues 16 and the fan-tail arch 4 and the checker work 18 thereunder a checker work 19 arranged in vertical flue formation and the spaced vertical flues 20. The checker work 19 provides one pass; the flues 20 provide another pass and the third are the flues 16 of the main checker work. The passes 19 and 20 are separated by a partition wall 21 which extends downwardly from the top of the regenerative chamber to a point suitably removed from the bottom of the chamber, to provide communication between the said passes. The outgoing gases therefore will pass from the slag-pocket through the checker work 18, thence into and down through the checker work forming the pass 19, thence under the wall 21 and up through the flues 20, which provide the second pass and thence down and through the flues 16 which constitute the third pass. The movement of the outgoing gases is illustrated by the arrangement of the arrows in Fig. 3; the movement of the incoming air being the reverse of that just described. The flues 20 in the second pass are provided by the spaced parallel walls 22, which at the base of the partition wall 21 extend beyond the wall and into the lower portion of the pass 19 and said walls 22 are preferably stepped downwardly, as shown, from the base of the wall 21 to the inner end wall of the chamber and such stepped portions provide a support for the checker work vertical flues in the pass 19 (which is correspondingly stepped at its upper end) and such an arrangement will materially aid in the collection and deposit of slag, as well as other impurities, to the protection of the main checker work. The arrangement disclosed and described, as pointed out, will provide a much greater and more effective heating area, which is heated by the outgoing gases and which said heated surfaces are employed to heat the incoming air. Furthermore, an arrangement of multiple passes, as shown, will make for a more efficient and economical operation by first, providing the increased heating area for the incoming air, which is evenly distributed, and second, giving a longer life to the regenerative chambers through the inter-position of the checker work 18 and 19 which provides for an effective collection of iron oxide, slag and other impurities and thereby gives greater protection to the main checker work comprising the vertical flues 16.

It is a common and well known practice in reversing furnaces of the type described, for the incoming air to be admitted through the gas tunnels or exhaust gas flues of the regenerative chambers, out through which, the products of combustion from the regenerators pass. My method, as has been pointed out, is to admit the air into the regenerative chambers at points different from the exhaust of the gases therefrom. Furthermore, in all furnaces of the type, with which I am familiar, the regenerative chambers are so constructed that the exhaust gases move in more or less confined lanes, so that there is an uneven distribution of the gases in and throughout the checker work, with the result that the checker work is not uniformly and evenly heated and then by admitting the incoming air to the regenerators through the gas tunnels or exhaust gas flues, out which pass the products of combustion, it has been found that the inertia of the air carries it to the opposite side of the regenerators and causes it to traverse lanes through the checkers, not traversed by or at least ineffectively heated by the outgoing gases, with the result that the incoming air is unevenly distributed as well as being ineffectively heated. These objections are eliminated and entirely obviated with my present method and structure which insures an even distribution of the outgoing gases and uniform and effective heating of the checkers, by such outgoing gases, and a consequent even distribution of the incoming air and an effective heating of the same.

The means for introducing air into the regenerators and for alternately controlling the introduction of the air to the respective regenerators, as well as the damper structure which alternately controls the exhaust gases to the stack from the respective regenerators, is best seen in Figs. 1, 6 and 7. Paralleling the outside ends of the respective regenerators, are flues 23 which communicate in a feeder 24 located between the regenerators and the furnace proper and preferably below the fan-tail arches. The feeder 24, in turn, is coupled to or has connection with a supply pipe 25 which, in turn, is connected with a suitable fan 26, or equivalent means which is operated by a suitable motor or power unit 27. The elements 26 and 27 as well as the supply pipe 25, in the present instance are preferably located between the regenerators, but may be located or disposed as convenience may dictate. The supply pipe 25, as shown, more or less diagrammatically in Fig. 1, is equipped with a suitable damper or valve 28, which, as will more fully appear, is timed in its operation with the means for supply fuel to the furnace.

Connected at spaced points to the flues 23 and depending therefrom, are flues 29, see Figs. 6 and 7, and there is provided a flue 29 for each of the flues or conduits 7 in each regenerator. Each flue 29 has coupled thereto an elbow 30 which, in turn, has connection with the wall of a regenerator, at the air inlet side thereof, and in line with an air inlet 8 to each flue or conduit 7 and these elbows, as shown in Fig. 7, have enlarged delivery or discharge ends, whereby the incoming air at the regenerators is somewhat reduced in velocity at the point of delivery to the regenerators. To further reduce the velocity of the incoming air, as well as diffuse and spread it as it enters the flues 7, I provide in the elbows 30 the perforated plates 30', see Fig. 7. This structure will act to prevent the inertia of the air from carrying it to the opposite ends of the flues 7, and in conjunction with the throttling arrangement at the exhaust ends of certain of said flues or conduits 7 facilitate a more even distribution of the incoming air to and through the checkers. I have called attention to a damper or valve 28 in the supply pipe 25, which is operated in conjunction with the fuel feed. For controlling the inlet of air to the regenerators, I provide in each flue 29 a valve 31 adapted to have a closing relation with a seat 32, for regulating the admission of air to the regenerators, from the flues 23. The valves 31 associated with a flue 29 are arranged for operation in unison, and such valves, at one end of the furnace are timed for operation so that when opened, the similar valves at the other end of the furnace are closed, and correspondingly, when one set of such valves are closed the other set are opened. Also, these two sets of multiple valves, at the opposite ends of the furnace have a co-operative and timed relation with dampers for alternately closing connection between the respective regenerators and the stack 13. These last mentioned dampers, of which there are two, are designated 33, being duplicates of each other and are located and operate in the lateral 11 at opposite sides of the short flue 12, in communication therewith, see Fig. 1. Such dampers have a timed relation so that when one is opened the other is closed and also have a timed relation with the sets of valves 31, so that when one set of valves is opened to admit air into one of the regenerators, the damper 33 controlling the exhaust of the products of combustion from that regenerator to the stack 13, is closed, and vice versa, as will be understood.

The means or mechanism for operating the sets of valves 31 and the dampers 33, in timed relation, as pointed out, comprises a power unit 34, as for example a hydraulic cylinder or electric motor which is arranged to reciprocate a rack-bar 35 which is adapted to impart oscillating movement to a gear pinion 36 on a shaft 37 to which is connected a pulley wheel 38 and also a crank-throw-arm 39. To each of the dampers 33 are connected the opposite ends of a cable 40 or other suitable flexible member, which is suitably and operatively connected with the pulley wheel 38, so that when the shaft 37 is oscillated the dampers 33 will be alternately raised and lowered. To the crank-throw-arm 39 are connected ends of corresponding but oppositely disposed or extended throw rods 41, which, at their opposite outer ends are connected, respectively, with crank arms 42, each connected to operate a shaft 43 disposed alongside the end of a regenerative chamber and on each shaft is secured, in spaced relation, a plurality of pulley wheels 44 and to each pulley wheel 44, is connected, in a suitable manner, a cable 45 which are each connected by a turn-buckle connection 45' with a rod or stem 46 and each said rod or stem connected with a valve 31, see Figs. 6 and 7. It should be apparent, therefore, that when the shaft 37 is oscillated that simultaneously and in unison one damper 33 will be opened and the other closed and likewise one set of valves 31 will be opened and the other set closed. Clean-out openings 47 are provided on each elbow 30, see Fig. 7. For purpose of illustration, and in a more or less diagrammatic manner, I have shown the unit 34 and actuating means associated therewith, located between the regenerators, but it is understood that other convenient arrangement of the operating mechanism may be provided.

I have previously made mention of a timing relation between the damper or valve 28 and certain fuel feeding devices. These devices are best seen in Figs. 8 and 9 and comprise burners 47, of any suitable or preferred construction, which are adapted to introduce fuel, preferably oil, as well as steam under pressure for atomizing the oil, to the furnace to commingle with the incoming air introduced in the usual manner through the air uptakes 2. The burners 47, are connected respectively, with oil and steam supply pipes 48 and 49 which, in turn, are connected with a suitable source of supply, and said supply pipes at suitable points are provided respectively, with control valves 50 and 51. The fuel valve 50 and the air control valve 28 in the air supply pipe 25 for operation from the same unit, are coupled in a manner, although not shown, so that measured and proportionate quantities of fuel and air can be supplied for the purpose of a proper combustion in the furnace. Admission of the fuel and steam to the opposite ends of the furnace is controlled through shut-off valves 52 and 53, in the pipes 48 and 49, see Figs. 8 and 9 and said valves have connected thereto gear pinions 54 and 55 arranged to be operated by a rack-bar 56 coupled to a power unit, as for example a hydraulic cylinder 57 which may be operated in any suitable and approved manner. The respective sets of valves 52 and 53 are coupled to be operated in unison, as shown, and are timed for operation on the reversal of the furnace so that when one set of valves is opened the other is closed.

It is known to those skilled in open hearth practice that when the furnace is charged entirely with a cold charge that the furnace can be materially speeded up if it is possible to use more fuel during the melting down period than during the refining period. Such being the case, it follows, therefore, that as the fuel is regulated it is also desirable that the exact amount of air shall be introduced for burning the fuel and yet only sufficient air to burn the fuel, since an excess of air has a tendency to over oxidize the steel and such a condition, when it exists will decrease the efficiency of the furnace and compel the heating of more air than is necessary for an ideal combustion within the furnace. Furthermore, it is recognized that a highly oxidizing atmosphere in the furnace is undesirable and can only be avoided if the proper amount of air for burning the fuel is introduced. The fuel and air feeding and control means which I have shown and described will accomplish these purposes and are so arranged and combined that as the fuel is increased the quantity of air necessary for a proper combustion, will also be increased. Since it is necessary and desirable to vary the amount of air and fuel, at different times of the heat, it will be obvious that the amount of material in the form of waste gases, will vary during different times of the heat. I have, therefore, provided for automatically maintaining a constant draft, of whatever amount is desired, at the furnace proper, that an approximate perfect regulation of the draft may be maintained at all times. The mechanism I employ for this purpose, in part at least, is of a standard character and includes a gasometer and a stack damper arranged with an electrical hook-up, and while a furnace structure of the character I have disclosed may be operated more efficiently and economically than furnaces with which I am familiar and without a stack damper and control, yet I prefer the inclusion of such an automatic controlled damper, as a more consistent operation may be obtained therewith. Referring to Figs. 1 and 2 the short flue 12 leading to the stack 13 is shown provided with a damper 58 and connected to said damper is a cable or flexible member 59, which, at its opposite end is connected to a threaded member 60 arranged for reciprocal movement in an oscillatable member 61 which is in operative connection with the armature shaft of a motor 62. Referring also to the same figures, it will be observed that there is associated with the furnace proper a gasometer 63 of a standard make and said gasometer is in communication with the interior of the furnace through a pipe 64, through which gases are admitted to the gasometer and such gases, will, accordingly as the pressure is high or low, raise or lower a float 65 and such movement of the float will correspondingly raise or lower a weighted lever arm 66 and said arm is adapted for alternate contact with contacts 67 and 68 in an electrical circuit which includes the motor 62 and a double field winding 69, best seen in Fig. 10. It will be obvious in a hook-up of this character that armature reversal is accomplished by field current reversal. The current feeding through one field winding in series with the armature will cause the armature to rotate in one direction; whereas the current feeding through the other field winding in series with the said armature will cause the armature to rotate in a reverse direction. The current travels through Line 1 to the gasometer 63, as a common feed to line F1 or F2, then through the armature to line A2 and thence to Line 2, completing the circuit, depending upon the position of the lever arm 66 of the gasometer. The direction of rotation of the motor 62 will depend, of course, on the path of the current through the field winding 69, which is in turn dependent upon the position of the gasometer lever arm 66. The actuation of the motor will alternately open or close the damper 58, and the opening and closing of the damper is dependent on the movement of the lever arm 66 of the gasometer, which in turn, is sensitive to the gases flowing from the furnace through the pipe 64 to the gasometer. In this way a constant draft may be maintained. The gasometer, motor, double field winding and electrical circuit are shown, more or less in a diagrammatic way and may be arranged substantially in the manner shown or modified to meet existing conditions at the furnace.

In Fig. 11 I have shown a modification of structure for the introduction of air to the regenerators at a point distinct from the point of the exhaust gases therefrom, as an illustration of what I have in mind and the extent to which the invention may be applied when, because of design and character of furnace the air must be admitted to the regenerator on the same side at which the exhaust gases are carried off, but admitting the air at a point or points distinct from the exhaust tunnel or waste gas flue out through which the waste gases are carried, as is the usual practice. In said Fig. 11 the waste gas flue 10 is spaced from the regenerator and the flue 7 beneath the checker work are extended thereto, as shown and at the ends of such flues where they communicate with the exhaust tunnel through the openings 9 the throttling means 14ª may be located. Also the flues 29, provided with the valves 31 are connected with the flues 7 at a point inwardly from their exhaust ends.

What I claim is:—

1. The method of controlling the movement of exhaust gases from an open hearth furnace and the introduction of air thereinto which consists in causing the exhaust gases to flow from the regenerators through waste-gas-flues alongside the regenerators at their base and thence to the furnace stack and introducing the incoming air to the regenerators on the side opposite the exhaust and at a point distinct from the waste-gas-flues.

2. The method of controlling the movement of exhaust gases from an open hearth furnace and the introduction of air thereinto which consists in causing the exhaust gases to flow from the regenerators through a plurality of exhaust openings on one side at their base and thence through waste-gas-flues alongside the regenerators to the furnace stack and introducing the incoming air to the regenerators on the side opposite the exhaust and at a plurality of points distinct from the waste-gas-flues.

3. The method of controlling the movement of exhaust gases from an open hearth furnace and the introduction of air thereinto which consists in causing the waste gases to exhaust through spaced openings on one side of and at the base of the regenerators and introducing the incoming air to the regenerators through spaced openings on the side opposite said exhaust openings and at the base of said regenerators.

4. The method of controlling the movement of exhaust gases from an open hearth furnace and the introduction of air thereinto which consists in causing the waste gases to pass from the regenerators through spaced exhaust openings located at one side at the base thereof, certain of which are throttled, and introducing the incoming air to the regenerators at points distinct from the exhaust and through spaced inlet openings located on the side opposite said exhaust openings and at the base of said regenerators.

5. The method of controlling the movement of exhaust gases from an open hearth furnace and the introduction of air thereinto which consists in causing the waste gases to pass from the regenerators through spaced exhaust openings located at one side at the base thereof, certain of which are throttled, and introducing the incoming air to the regenerators at points distinct from the exhaust and through spaced inlet openings located on the side opposite said exhaust openings and at the base of said regenerators, each of which is valve controlled.

6. The method of operating an open hearth furnace which consists in causing the exhaust gases to flow in a downward path through the checker work of the regenerators and be exhausted therefrom at the base of the regenerators through lateral passages of travel, certain of which are throttled, and admitting the incoming air to the base of the regenerators through said lateral passages and at points distinct from the exhaust of the waste gas therefrom and causing said incoming air to travel upwardly through the checker work.

7. The method of operating an open hearth furnace which consists in causing the exhaust gases to flow in a downward path through the checker work of the regenerators and be exhausted therefrom at the base of the regenerators through lateral passages of travel, certain of which are throttled, and admitting the incoming air to said lateral passages through controlled inlets at distinct points from the exhaust of the waste gas therefrom and causing said incoming air to travel upwardly through the checker work.

8. The method of operating an open hearth furnace which consists in causing the exhaust gases to flow in a downward path through the checker work of the regenerators and be exhausted therefrom at the base of the regenerators through lateral passages of travel and thence to the stack through a waste-gas-flue, and admitting the incoming air into said lateral passages at points distinct from the exhaust of the gases therefrom and causing said incoming air to travel upwardly through the checker work.

9. The method of operating an open hearth furnace which consists in passing the exhaust gases entering the regenerators from the furnace downwardly through checker work of the vertical flue type and exhausted therefrom at the base of the regenerators through lateral passages, certain of which are throttled, thence to the stack through a waste-gas-flue, and admitting the incoming air to said lateral passages through controlled inlets at distinct points from the exhaust of the waste gas therefrom and causing said incoming air to travel upwardly through said vertical flues.

10. The method of operating an open hearth furnace which consists in passing the waste gases from the furnace through a checker work under the fan-tail arches for purposes of scouring such gases; thence passing such gases down through vertical flue checkers in the regenerators and carrying off the gases from the regenerators through lateral passages in the base of the regenerators and to the stack through waste-gas-flues; and admitting air to the regenerators through said lateral passages at points distinct from the exhaust of the gases therefrom and thence upwardly through said vertical flues and the checker work in the fan-tail arches to the furnace.

11. The method of operating an open hearth furnace which consists in passing the waste gases from the furnace through a checker work under the fan-tail arches for purposes of scouring such gases; thence passing such gases down through vertical flue checkers in the regenerators and carrying off the gases from the regenerators through lateral passages in the base of the regenerators, certain of which are throttled, and thence to the stack through waste-gas-flues; and admitting the incoming air to said lateral passages through controlled inlets at points distinct from the exhaust of the gases therefrom and thence upwardly through said vertical flues and the checker work in the fan-tail arches to the furnace.

12. The method of operating an open hearth furnace which consists in passing the waste gases from the furnace through checker work under the fan-tail arches for purposes of scouring such gases; thence passing such gases through regenerators of a multiple pass type, certain of said passes comprising checker work of the vertical flue type and carrying off the gases from the regenerators through lateral passages in the base of the regenerators and to the stack through waste-gas-flues; and admitting air to the regenerators through said lateral passages at points distinct from the exhaust of the gases therefrom and thence through the multiple passes of the regenerators and the checker work in the fan-tail arches to the furnace.

13. The method of operating an open hearth furnace which consists in controlling the admission of fuel and air to the furnace; in carrying off the waste gases from the furnace through regenerators of the vertical flue checker type and carrying off such gases through lateral passages at the base of the regenerators, certain of said passages being throttled, and thence to the stack through waste-gas-flues; and admitting the incoming air to the furnace through controlled inlets to said passages, at points distinct from the exhaust of gases therefrom, and thence upwardly through said vertical flues to the furnace.

14. The method of controlling the movement of exhaust gases from an open hearth furnace and the introduction of air thereinto which consists, in so restricting the exhaust of the gases at the point or points of egress from the regenerators, as to obtain an approximate uniform and even distribution of such gases throughout the regenerators and thereby heat the same to an approximate uniform temperature throughout, and introducing the incoming air into the regenerators at points distinct from the point or points of egress of the exhaust gases therefrom and causing such air to flow uniform and even through the regenerators to be heated thereby.

15. The method of controlling the movement of exhaust gases from an open hearth furnace and the introduction of air thereinto which consists, in so restricting the exhaust of the gases at the point or points of egress from the regenerators, as to obtain an approximate uniform and even distribution of such gases throughout the regenerators and thereby heat the same to an approximate uniform temperature throughout, and introducing the incoming air into the regenerators at points distinct from the point or points of egress of the exhaust gases therefrom and under control such as will cause the air to flow in an approximate uniform and even manner through the regenerators and to be heated thereby.

16. The method of operating an open hearth furnace which consists in exhausting the waste gases from the furnace through the checker work of the regenerators; discharging the waste gases from the regenerators through lateral passages of travel below the checker work and thence from said passages through exhaust outlets, the area of the openings of certain of which vary with respect to each other, whereby to obtain an approximate uniform and even distribution of the outgoing gases through the regenerators and thereby heat the same to an approximate uniform temperature throughout, and supplying measured quantities of air to said passages through air inlets which are distinct from said exhaust outlets.

17. The method of operating an open hearth furnace which consists in exhausting the waste gases from the furnace through the checker work of the regenerators; discharging the waste gases from the regenerators through lateral passages of travel below the checker work and thence from said passages through exhaust outlets, the area of the openings of certain of which vary with respect to each other, whereby to obtain an approximate uniform and even distribution of the outgoing gases through the regenerators and thereby heat the same to an approximate uniform temperature throughout, supplying measured quantities of air to said passages through air inlets which are distinct from said exhaust outlets, and reducing the velocity of the air immediately on its entrance into each passage.

18. The method of operating an open hearth furnace which consists in causing the exhaust gases to flow in a downward path through the checker work of the regenerators and be exhausted therefrom at the base of the regenerators through lateral passages of travel, the area of the outlets of certain of which said passages vary in respect of each other, whereby to obtain an approximate uniform and even distribution of the outgoing gases through the regenerators and thereby heat the same to an approximate uniform temperature throughout, and admitting the incoming air to the base of said regenerators through said lateral passages and at points distinct from said waste gas outlets, and causing said incoming air to travel upwardly through the checker work.

19. The method of operating an open hearth furnace which consists in causing the exhaust gases to flow in a downward path through the checker work of the regenerators and be exhausted therefrom at the base of the regenerators through lateral passages of travel, the area of the outlets of certain of which said passages vary in respect of each other, whereby to obtain an approximate uniform and even distribution of the outgoing gases through the regenerators and thereby heat the same to an approximate uniform temperature throughout, admitting the incoming air in measured quantities, to the base of said regenerators through said lateral passages and at points distinct from said waste gas outlets and causing said incoming air to travel upwardly through the checker work, and reducing the velocity of the air immediately on its entrance into each passage.

20. The method of operating an open hearth furnace which consists in exhausting the products of combustion from one side of the regenerators and admitting the incoming air to the furnace into the opposite side of said regenerators, and throttling the exhaust so as to cause a distribution of the products of combustion approximately evenly through the regenerators and in consequence thereof to obtain an approximate even and uniform heating of the incoming air.

21. The method of operating an open hearth furnace which consists in exhausting the products of combustion from one side of the regenerators and admitting the incoming air to the furnace into the opposite side of said regenerators, throttling the exhaust so as to cause a distribution of the products of combustion approximately evenly through the regenerators and in consequence thereof to obtain an approximate even and uniform heating of the incoming air, supplying measured quantities of air to the regenerators, and reducing the velocity of the air immediately on its entrance into the regenerators.

22. The method of operating an open hearth furnace which consists in causing the exhaust gases to flow in a downward path through the checker work of the regenerators and to be exhausted therefrom at the base of the regenerators through lateral passages of travel, throttling the exhaust ends of at least some of said passages so as to obtain an approximate uniform temperature in and throughout the several passages, and admitting the incoming air to the base of said regenerators at the opposite ends of said passages and causing said incoming air to travel upwardly through said checker work.

23. The method of operating an open hearth furnace which consists in causing the exhaust gases to flow in a downward path of travel through the checker work of the regenerators and to be exhausted therefrom at the base of the regenerators through lateral passages of travel, throttling the exhaust ends of at least some of said passages so as to obtain an approximate uniform temperature in and throughout the several passages, supplying measured quantities of air to the regenerators at the opposite ends of said passages, and reducing the velocity of the air immediately on entering said passages.

24. The method of operating an open hearth furnace which consists in exhausting the exhaust gases from the regenerators through a plurality of exhaust openings, admitting air into the regenerators through a plurality of air inlet openings distinct from said exhaust openings, and throttling at least some of said exhaust openings in a manner to obtain an approximate even distribution of the exhaust gases through the regenerators and in consequence thereof to obtain an approximate even and uniform heating of the incoming air.

25. The method of operating an open hearth furnace which consists in exhausting the exhaust gases from the regenerators through a plurality of spaced exhaust openings, supplying measured quantities of air to the regenerators through a plurality of spaced air inlet openings distinct from said exhaust openings, reducing the velocity of the air immediately on entering the regenerators, and throttling at least some of said exhaust openings in a manner to obtain an approximate even distribution of the exhaust gases through the regenerators and in consequence thereof to obtain an approximate even and uniform heating of the incoming air.

26. The method of operating an open hearth furnace which consists in causing the exhaust gases leaving the furnace to flow in a downward path through the checker work of the regenerators and at the base thereof causing said products of combustion to be diverted by separate lanes of travel at right angles to the path of travel through the checker work and exhausted from the regenerators through egress openings, supplying air to the regenerators through ingress openings distinct from said egress openings and causing the air to traverse the paths of travel to the furnace traversed by the outgoing gases, and varying the area of certain of said egress openings from other of said openings whereby to obtain an approximate even distribution of the products of combustion through the regenerators and in consequence thereof to obtain an approximate even and uniform heating of the incoming air admitted to said regenerators.

27. The method of operating an open hearth furnace which consists in causing the exhaust gases leaving the furnace to flow in a downward path through the checker work of the regenerators and at the base thereof causing said products of combustion to be diverted by separate lanes of travel at right angles to the path of travel through the checker work and exhausted from the regenerators through egress openings, supplying measured quantities of air to the regenerators through ingress openings distinct from said egress openings and causing the air to traverse the paths of travel to the furnace traversed by the outgoing gases, reducing the velocity of the air immediately on its entrance into the regenerators, and varying the area of certain of said egress openings from other of said openings whereby to obtain an approximate even distribution of the products of combustion through the regenerators and in consequence thereof to obtain an approximate even and uniform heating of the incoming air admitted to said regenerators.

28. In an open hearth furnace, a regenerator including checker work of the vertical flue type and lateral passages at the base of the regenerator in communication with said flues, said passages having exhaust openings at one end for the egress of exhaust gases and air inlet openings at their opposite ends for the ingress of incoming air.

29. In an open hearth furnace, a regenerator including parallel spaced rider walls in the base thereof providing lateral passages therebetween one end of which have exhaust gas openings and their opposite ends having air inlet openings, and a checker work of the vertical flue type above said rider walls.

30. In an open hearth furnace, a regenerator including parallel spaced rider walls in the base thereof providing lateral passages therebetween, a checker work of the vertical flue type above said rider walls, means to carry off the exhaust gases from one end of said passages, and means for introducing the incoming air to said passages at points distinct from the exhaust of the gases therefrom.

31. In an open hearth furnace, a regenerator including parallel spaced rider walls in the base thereof providing lateral passages therebetween, a checker work of the vertical flue type above said rider walls, means to carry off the exhaust gases from one end of said passages, means to throttle the exhaust ends of said passages, means to introduce incoming air to the opposite ends of said passages, and valve means to control the admission of air to each of said passages.

32. In an open hearth furnace, a regenerator including parallel spaced rider walls in the base thereof disposed transversely to the length of the regenerator to provide lateral passages therebetween extending from side to side of the regenerator, a checker work of the vertical flue type above said rider walls, a waste-gas-flue extending longitudinally alongside said regenerator and in communication with said passages, means to introduce incoming air into said passages, and valve means to control the admission of air into said passages.

33. In an open hearth furnace, a regenerator provided with a plurality of lateral passages in parallel relation in the base thereof, a waste-gas-flue along one side of the regenerator in communication with each passage, an air feeder also along one side of the regenerator, valve means providing communication between said feeder and said passages, and checker work of the vertical flue type above said passages.

34. In an open hearth furnace, a stack, a regenerator provided with a plurality of lateral passages in parallel relation in the base thereof, a waste-gas-flue along one side of the regenerator in communication with said stack and with each passage, a damper controlling communication between said flue and said stack, an air feeder also along one side of the regenerator, valve means providing communication between said feeder and said passages, said valve means and said damper arranged for opening and closing alternately in respect to each other, and a checker work of the vertical flue type above said passages.

35. In an open hearth furnace, a regenerator provided with a plurality of lateral passages in parallel relation in the base and opening out the sides thereof, a waste-gas-flue along one side of the regenerator arranged for communication with the exhaust end of each passage, means to throttle the exhaust ends of said passages, an air feeder along the opposite side of said regenerator, valved means providing communication between said feeder and air inlet end of each passage, and a checker work of the vertical flue type above said passages.

36. In an open hearth furnace, a regenerator provided with a plurality of lateral passages in parallel relation in the base and opening out the sides thereof, the end of each passage at the air admission side of the regenerator having diverging walls inwardly, means to throttle the exhaust end of each passage, a waste-gas-flue alongside the regenerator in communication with the exhaust end of each passage, an air feeder alongside the regenerator arranged for communication with the air admission end of each passage, valves controlling the admission of air from the feeder to the passages, and a checker work of the vertical flue type above said passages.

37. In an open hearth furnace, a regenerator provided with a plurality of lateral passages in parallel relation in the base and opening out the sides thereof, the end of each passage at the air admission side of the regenerator having diverging walls inwardly, means to throttle the exhaust end of each passage, a waste-gas-flue alongside the regenerator in communication with the exhaust end of each passage, an air feeder alongside the regenerator having a connection with the air admission end of each passage, means in each said connection to diffuse the air as it is discharged into the passages, a valve means at each connection for controlling the discharge of air from the feeder, and a checker work of the vertical flue type above said passages.

38. In an open hearth furnace, a stack, a pair of regenerators each provided with a plurality of lateral passages in parallel relation in the base thereof, a waste-gas-flue alongside each regenerator in communication with said stack, and with a set of passages, a damper for each flue controlling communication between a set of passages and said stack, an air feeder alongside each regenerator and having connection with a set of passages, valved means controlling the admission of air from said feeders to said passages, means to operate said dampers and said valved means, so arranged that the damper and set of valves for a regenerator are alternately opened and closed, and a checker work of the vertical flue type above said passages.

39. In an open hearth furnace, a stack, a pair of regenerators each provided with a plurality of lateral passages in parallel relation in the base thereof, a waste-gas-flue providing communication between said passages and said stack, a pair of dampers in said flue one for each regenerator, a fan, means to operate the fan, an air feeder alongside each regenerator supplied with air by said fan, a connection between each feeder and the passages of each regenerator, a valve in each connection, operating connections between said dampers and said valves, means to operate said connections, and a checker work of the vertical flue type above said passages.

40. In an open hearth furnace, fuel feeding means and means controlling the supply of fuel to the furnace, a stack, a pair of regenerators each provided with a plurality of lateral passages in parallel relation in the base thereof, a waste-gas-flue providing communication between said passages and said stack, a pair of dampers in said flue one for each regenerator, a fan, means to operate the fan, an air feeder alongside each regenerator, a supply pipe connecting each feeder with said fan, a controlling valve in said supply pipe adapted for operation in timed relation with the fuel controlling means, a connection between each feeder and the passages of each regenerator, a valve in each connection, operating connections between said dampers and said valves, means to operate said connections, and a checker work of the vertical flue type above said passages.

41. In an open hearth furnace, in combination, a stack, a damper for regulating the draft through the stack, a fuel feed and controlling valve therefor, a pair of regenerators each provided with a plurality of lateral passages in parallel relation in the base thereof, a waste-gas-flue alongside each regenerator having communication with its passages and said stack, a damper in each flue, an air feeder alongside each regenerator, means to supply air under pressure to each feeder, a valve controlling the air supply, said fuel and air controlling valves arranged for timed relation, connections between each feeder and the passages in each regenerator, valves in each connection, operating connections between the flue dampers and said last mentioned valves, means to operate said connections, a checker work of the vertical flue type above said passages, a gasometer connected with the furnace and sensitive to the pressure of the gases therein, and operating connections between said gasometer and said stack damper.

42. In an open hearth furnace, in combination, a stack, a damper for regulating the draft through the stack, a fuel feed and controlling valve therefor, a pair of regenerators each provided with a plurality of lateral passages in parallel relation in the base and opening out of the sides thereof, means to throttle the exhaust ends of said passages, the air admission ends of the passages having inwardly diverging walls, a waste-gas-flue alongside the exhaust side of each regenerator having communication with the exhaust end of the passages thereof and the stack, a damper in each flue, an air feeder alongside each regenerator having a connection with the air admission ends of each passage, means to diffuse the air as it passes from each feeder to said passages, valves controlling the passage of air from said feeders to each of said passages, operating connections between the flue dampers and said valves, means to operate said connections, means to supply air under pressure to each feeder, a valve controlling the air supply, said fuel and air controlling valves arranged for timed relation, a checker work of the vertical flue type above said passages, a gasometer connected with the furnace and sensitive to the pressure of the gases therein, and operating connections between said gasometer and said stack damper.

43. In an open hearth furnace, the combination of a regenerator and a fan-tail arch connecting the same with the furnace, a checker work of the vertical flue type in the regenerator, lateral passages in parallel relation arranged below the checker work and in communication with the flues thereof, means to exhaust the waste gases from one end of the said passages, means to admit air to the opposite ends of the said passages, and a checker work under the fan-tail arch whereby to scour the waste gases passing from the slag pockets of the furnace to the regenerator.

44. In an open hearth furnace, the combination of a regenerator and a fan-tail arch connecting the same with the furnace, the regenerator provided with a multiple of passes therethrough, one comprising a main checker work, another a checker work next adjacent the fan-tail arch and having a stepped formation at its lower end and a third interposed between said last mentioned checker work and the main checker work of the regenerator and in communication with both and comprising a plurality of spaced vertical flues; and a checker work under the fan-tail arch whereby to scour the waste gases passing from the slag pocket of the furnace to the regenerator.

45. In an open hearth furnace, the combination of a regenerator and a fan-tail arch connecting the same with the furnace, the regenerator provided with a multiple of passes therethrough, one comprising a main checker work of a vertical flue type, another a checker work of a vertical flue type next adjacent the fan-tail arch and having a stepped formation at its lower end and a third interposed between said last mentioned checker work and the main checker work of the regenerator and in communication with each and comprising a plurality of spaced vertical flues, a plurality of lateral passages arranged in parallel relation below the main checker work, means to carry off the exhaust gases from one end of each of said passages, means to admit incoming air into said passages at points distinct from the exhaust of the exhaust gases therefrom, and a checker work under the fan-tail arch whereby to scour the waste gases passing from the slag pocket of the furnace to the regenerator.

46. In an open hearth furnace, the combination of a regenerator provided with multiple passes providing a tortuous path for the passage of the outgoing waste gases and incoming air, laterally disposed passages at the base of one of said passes, means to restrict the exhaust of the waste gases from one end of said passages so as to obtain an approximate uniform and even heating of the entire regenerator checker work, means to introduce the incoming air into the opposite ends of said passages, and means to control the supply of air admitted to each passage.

47. In an open hearth furnace, a regenerative chamber provided with a plurality of passages in its base below the checker work and extending across the regenerator, each passage having an outlet for exhaust gases from the regenerator and also having an inlet distinct from said outlets for the admission of incoming air to the regenerator.

48. In an open hearth furnace, a stack, a regenerative chamber provided with a plurality of passages in its base below the checker work and extending across the regenerator, each passage having an outlet for exhaust gases from the regenerator and also having an inlet distinct from said outlets for the admission of incoming air to the regenerator, and an exhaust gas flue in communication with said exhaust outlets and with said stack.

49. In an open hearth furnace, a regenerative chamber of the vertical flue type having a plurality of parallel arranged passages disposed transversely of the chamber below said flues and in communication therewith, means for regulating the discharge of the products of combustion from one end of at least some of said passages, and means for admitting and controlling the admission of air to the opposite ends of said passages.

50. In an open hearth furnace, a regenerative chamber of the vertical flue type having a plurality of parallel arranged passages disposed transversely of the chamber below said flues and in communication therewith, means for regulating the discharge of the products of combustion from one end of at least some of said passages, means for supplying measured quantities of air to the opposite ends of said passages, and means for reducing the velocity of the air immediately on entering said passages.

51. In an open hearth furnace, a regenerative chamber having a checker work the lower end of which is spaced above the bottom of the chamber, means dividing the chamber beneath the checker work into a plurality of transversely arranged passages, means for regulating the discharge of the products of combustion from one end of at least some of said passages, and means for admitting and controlling the admission of air to the opposite ends of said passages.

52. In an open hearth furnace, a regenerative chamber having a checker work the lower end of which is spaced above the bottom of the chamber, means dividing the chamber beneath the checker work into a plurality of transversely arranged passages, means for regulating the discharge of the products of combustion from one end of at least some of said passages, means for supplying measured quantities of air to the opposite ends of said passages, and means for reducing the velocity of the air immediately on entering said passages.

53. In an open hearth furnace, a regenerative chamber having a checker work, a plurality of exhaust openings at the base on one side of said chamber for the exhaust of the exhaust gases therefrom, a plurality of air inlet openings at the base on the opposite side of said chamber for the admission of the incoming air thereinto, a flue alongside said chamber in communication with said exhaust openings, a stack connecting with said flue, means for throttling at least some of said exhaust openings whereby to obtain an approximate even distribution of the outgoing gases through the checkers and in consequence thereof to obtain an approximate even and uniform heating of the incoming air, and air conducting means to each of said air inlet openings.

54. In an open hearth furnace, in combination, a regenerator having a checker work of the vertical flue type of stepped formation at its upper end, a fan-tail arch connecting the regenerator with the furnace, a checker work in said arch, a plurality of spaced transversely disposed passages below the checker work of the regenerator and in communication therewith and opening out of opposite sides of said regenerator whereby to discharge the exhaust gases from one side of the regenerator and admit the incoming air to the opposite side thereof, means for throttling at least some of the exhaust ends of said passages whereby to obtain an approximate even distribution of the outgoing gases through the checker work of the regenerator and in consequence thereof to obtain an approximate even and uniform heating of the incoming air, and air conducting means to each of said passages.

55. In an open hearth furnace the combination of a regenerator and a fan-tail arch connecting the same with the furnace, the regenerator provided with a multiple of passes therethrough, one comprising a main checker work of the vertical flue type, another a checker work of the vertical flue type next adjacent the fan-tail arch and having a stepped formation at its lower end and a third interposed between said last mentioned checker work and said main checker work of the regenerator and in communication with each, a checker work under the fan-tail arch whereby to scour the waste gases passing from the slag pocket of the furnace to the regenerator, a plurality of spaced transversely disposed passages below said main checker work and in communication therewith and opening out of opposite sides of said regenerator whereby to discharge the exhaust gases from one side of the regenerator and admit the incoming air to the opposite side thereof, means for throttling at least some of the exhaust ends of said passages whereby to obtain an approximate even distribution of the outgoing gases through the checker work of the regenerator and in consequence thereof to obtain an approximate even and uniform heating of the incoming air, and air conducting means to each of said passages.

56. In an open hearth furnace, in combination with a regenerator having a checker work and the slag-pocket of the furnace, of a fan-tail arch between the regenerator and the slag-pocket, and a checker work under the fan-tail arch stepped up at its bottom portion from the slag-pocket adapted to scour the products of combustion passing from the furnace to the regenerator.

57. In an open hearth furnace, in combination with a regenerator having a main checker work and the slag-pocket of the furnace, of a fan-tail arch between the regenerator and the slag-pocket, a checker work under the fan-tail arch stepped up at its bottom portion from the slag-pocket adapted to scour the products of combustion passing from the furnace to the regenerator, and a supplemental checker work interposed between the fan-tail arch and said main checker work which is stepped downwardly at its upper portion toward the fan-tail arch.

58. In an open hearth furnace, in combination with the regenerator and fan-tail arch connecting the same with the furnace, of a checker work under the fan-tail arch stepped up at its bottom portion from the slag-pocket of the furnace adapted to scour the products of combustion passing from the furnace to the regenerator, and a checker work in the regenerator which is stepped downwardly at its upper portion toward the fan-tail arch.

WILLIAM H. SOMMER.